United States Patent [19]

Swamikannu

[11] Patent Number: 5,145,584
[45] Date of Patent: Sep. 8, 1992

[54] PROCESSES FOR USING A THIN FILM COMPOSITE ULTRAFILTRATION MEMBRANE

[75] Inventor: A. Xavier Swamikannu, Mt. Prospect, Ill.

[73] Assignee: Allied-Signal Inc., Morris Township, Morris County, N.J.

[21] Appl. No.: 785,847

[22] Filed: Oct. 31, 1991

Related U.S. Application Data

[63] Continuation-in-part of Ser. No. 622,564, Dec. 5, 1990, Pat. No. 5,085,775.

[51] Int. Cl.$^5$ .............................................. B01D 61/00
[52] U.S. Cl. .................................... 210/650; 210/651; 210/653; 210/500.27; 210/500.34; 210/490; 264/45.5
[58] Field of Search ............... 210/650, 651, 652, 653, 210/500.27, 500.41, 500.34, 490; 264/45.5

[56] References Cited

U.S. PATENT DOCUMENTS

| | | | |
|---|---|---|---|
| 3,276,598 | 10/1966 | Michaels et al. | 210/500.34 |
| 3,516,588 | 6/1970 | O'Donnell | 226/43 |
| 3,546,142 | 1/1967 | Michaels et al. | 210/500.34 |
| 3,549,569 | 12/1970 | Farah et al. | 260/18 |
| 3,661,634 | 5/1972 | Riley et al. | 117/161 UA |
| 3,767,737 | 10/1973 | Lundstrom | 264/41 |
| 3,892,655 | 7/1975 | Hickson | 208/111 |
| 4,005,012 | 1/1977 | Wrasidlo | 210/23 H |
| 4,132,824 | 1/1979 | Kimura et al. | 428/220 |
| 4,220,535 | 9/1980 | Leonard | 210/321 |
| 4,243,701 | 1/1981 | Riley et al. | 427/244 |
| 4,262,041 | 4/1981 | Eguchi et al. | 427/245 |
| 4,272,378 | 6/1981 | San et al. | 210/500 |
| 4,927,540 | 5/1990 | Wesling et al. | 210/500.34 |
| 5,085,775 | 2/1992 | Swamikannu | 210/500.27 |

FOREIGN PATENT DOCUMENTS 836342  3/1970  Canada .

*Primary Examiner*—Robert A. Dawson
*Assistant Examiner*—Ana M. Fortuna
*Attorney, Agent, or Firm*—Mary Jo Boldingh; Harold N. Wells; Gerhard H. Fuchs

[57] ABSTRACT

Processes for using a thin film ultrafiltration membrane for the separation of low molecular weight solutes such as the separation of glucose from sucrose and higher molecular weight sugars and the separation of amino acids from oligopeptides and polypeptides. The membrane possesses desirable properties or characteristics, and may be prepared by casting a solution of a polyelectrolyte complex on a microporous support to form a thin film of polyelectrolyte complex on the surface of the support. The thickness of the membrane will range from about 600 to 3,000 A.

21 Claims, No Drawings

PROCESSES FOR USING A THIN FILM COMPOSITE ULTRAFILTRATION MEMBRANE

CROSS-REFERENCE TO RELATED APPLICATIONS

This application is a continuation-in-part of our prior application Ser. No. 07/622,564, filed Dec. 5, 1990 now U.S. Pat. No. 5,085,775.

BACKGROUND OF THE APPLICATION

The use of semipermeable membranes for the separation of gases or liquids in reverse osmosis or ultrafiltration processes is well known. For example, in a reverse osmosis process, high pressure saline water may be placed in contact with a semipermeable membrane which is permeable to water but relatively impermeable to salt. Concentrated brine and relatively pure water are separated thereby; the relatively pure water may then be utilized for personal use such as drinking, cooking, etc., while the brine may be discarded. In addition, membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

This ability to separate gases from a mixture stream will find many applications in commercial uses. For example, gas separation systems may be used for oxygen enrichment of air, for improved combustion efficiencies and conservation of energy resources. Likewise, nitrogen enrichment of air may be applicable where inert atmospheres are required. Other applications for oxygen enriched gases may be improving selectivity and efficiency of chemical and metallurgical processes. Similarly, inert atmospheres such as may be provided for by this invention may also be utilized in chemical and metallurgical processes. Some other applications of gas separation would include helium recovery from natural gas, hydrogen enrichment in industrial process applications, and scrubbing of acid gases. Specific uses for oxygen enrichment of air would be breathing systems for submarines and other underwater stations, improved heart-lung machines, and other lung assist devices. Another specific application of a gas separation system would be an aircraft to provide oxygen enrichment for life-support systems and nitrogen enrichment for providing an inert atmosphere for fuel systems. In addition, gas separation systems may be used for environmental benefits, e.g., methane can be separated from carbon dioxide in waste gases for sewage treatment processes and oxygen enriched air can be produced to enhance sewage digestion.

Another use for which membranes may be employed is the separation of polysaccharides into useable constituents. For example, in many commercial enterprises sugar is utilized to a great extent for its sweetening properties. It is used in the sweetening of foods, for the manufacture of syrups and confectionery items, in preserves and jams, as a chemical intermediate for detergents, emulsifying agents and other sucrose derivatives such as plasticizers, resins, glues, etc. The usual derivation of sugar is from cane sugar and sugar beets. It is obtained by crushing and extracting the sugar from the cane with water or extracting the sugar from the sugar beet with water followed by evaporation and purifying with lime, absorbent carbon and/or various liquids. The chief component of this type of sugar is sucrose, while other sugars may contain components such as dextrose, glucose and fructose and other polysaccharides. Other polysaccharides which possess sweetening properties include maltose, etc. The various polysaccharides possess varying degrees of sweetness, especially when in pure form and not contaminated by any reversion products.

One source of glucose which possesses a relatively high degree of sweetness and which, in turn, may be converted to fructose, the latter possessing an even greater degree of sweetness is starch. As is well known, starch is present in many naturally-occurring plants including corn, potatoes, rice tapioca, wheat, etc. Heretofore, it has been known to treat starch with an enzyme such as amyloglucosidase to obtain glucose. However, the treatment heretofore provided entailed a relatively long residence time in order to obtain a glucose syrup which contained about 94% glucose. The relatively long residence time which has heretofore been required restricts the throughput of glucose and results in the appearance of reversion products which impart a bitter taste to the glucose, thus negating the sweetening property of the compound as well as requiring further treatment in order to remove the offending product. One such reversion product which imparts a bitter taste comprises isomaltose.

Many methods involving the use of an enzyme such as amyloglucosidase to convert starch into sugar have been tried. However, each of these methods has some disadvantages attached hereto. For example, when using a free enzyme, it is necessary to continuously replace the enzyme which is lost during the production of the desired saccharide. Likewise, when using an immobilized enzyme, the heretofore relatively long residence time has resulted in the appearance of unwanted side products.

One method of overcoming many of the disadvantages hereinbefore set forth is to contact the feedstock such as starch with an enzyme for relatively short residence time and thereafter subjecting the partially hydrolyzed reaction mixture which is obtained from the conversion reaction to an ultrafiltration step wherein said reaction mixture is passed over a membrane whereby higher glucose syrup will pass through the membrane as a permeate while the retentate material containing unhydrolyzed oligosaccharides may be recycled for additional treatment.

In addition other uses of membranes will include milk whey separation as well as concentration of proteins.

As will hereinafter be shown in greater detail, by utilizing the membranes of the present invention, it is possible to obtain a high degree of saccharide separation, which results in the obtention of desired products at a relatively low operating cost. It is also possible to obtain a high degree of separation of amino acids from oligopeptides and polypeptides, the "polymers" of amino acids. Oligopeptides generally include the shorter chain polymers of a given amino acid, e.g. the dimers, trimers, tetramers, and possibly pentamers of amino acids. Polypeptides are the larger polymers.

Heretofore, membranes which may be used for reverse osmosis or ultrafiltration processes have been prepared using a wide variety of chemical compounds to obtain the desired membrane. For example, U.S. Pat. No. 3,892,655 discloses a membrane and a method for producing the membrane in which a thin polymer film is formed on the surface of a liquid, generally water and is subsequently transferred to the surface of a porous supporting membrane. During the transfer of thin polymer film, the porous support is maintained in a wetted stage with the liquid. Another U.S. Pat. No. 3,516,588 discloses a macromolecular fractionation process and describes a porous ultrafiltration membrane which is selective on the basis of pore size. Likewise, U.S. Pat. No. 3,767,737 discloses a method for producing the casting of "ultra-thin" polymer membranes similar in nature to previously mentioned U.S. Pat. No. 3,892,655 in that the thin film of the membrane is formed on the surface of a liquid and transferred to the surface of a porous support membrane. However, the thin film polymer will thus inherently possess the same disadvantage which may be ascribed to the membrane formed by the latter patent in that the thin film of the finished membrane is weakly attached to the porous support and the membrane thus produced cannot withstand substantial back pressure when in operation.

As was previously mentioned, semipermeable membranes have been prepared from a variety of compounds by utilizing a polymer as the membrane-forming material. Examples of semipermeable membrane-forming polymers which have been used will include silicon-containing compounds such as dimethyl silicone, silicone-carbonate copolymers fluorinated silicones, etc., polystyrene-polycarbonate, polyurethanes, styrene-butadiene copolymers, polyarylethers, epoxides, cellulose nitrate, ethyl cellulose, cellulose acetate mixed with other cellulose esters, etc. The membrane resulting from the polymer is usually composited on a finely porous support membrane such as polysulfone, cellulose nitrate-cellulose acetate, etc., the composition being, if so desired, impregnated on a natural fabric such as canvas, cotton, linen, etc. or on a synthetic fabric such as Dacron, Nylon, Orlon, etc.

Examples of some semipermeable membranes which have been used in the past are those described in U.S. Pat. No. 4,005,012 which discloses a thin-film composite membrane comprising a cross-linked epiamine composited on a porous support such as polysulfone, the composition being impregnated on a backing material such as Dacron. U.S. Pat. No. 4,132,824 discloses an ultra-thin film of a polymer composite comprising a blend of a methylpentene polymer and an organopolysiloxane-polycarbonate interpolymer while U.S. Pat. No. 4,243,701 discloses a membrane comprising a dimethyl silicone composited on a cellulose nitrate-cellulose acetate support member.

In addition to the aforementioned patents, other U.S. patents also disclose membrane materials. For example, U. S. Pat. No. 4,262,041 discloses a process for preparing a composite amphoteric ion-exchange membrane by forming a membrane from a solution or emulsion of a polymer having either a cation or anion exchange group and a functional group which is capable of receiving another ion exchange group having an opposite sign from the cation or anion exchange group or a mixture of two polymers, one of which has either a cation or anion exchange group and the other polymer has a functional group capable of receiving an ion exchange group having the opposite sign from the cation or anion exchange group and introducing the ion exchange group of an opposite sign to said functional group. This is in contradistinction to the membrane of the present invention in which a composite of two polymers, said composite already being cross-linked, is cast on a porous support member.

U.S Pat. No. 3,661,634 describes the use of an Interpenetrating Polymer Network membrane for reverse osmosis. The membrane is prepared from poly (vinylpyrrolidinone) as the host polymer and polyisocyanates as the guest polymer component with these latter prepolymers being chosen from those materials used in urethane coating and foam applications. The membrane is generated by casting a solution of the host and guest polymer and then curing said membrane via a two-stage process. The result is a membrane which exhibits increased salt rejection with increasing isocyanate equivalent ratio.

U.S. Pat. No. 4,272,378 is drawn to a semipermeable membrane involving the use of polymers containing more than 40 mole percent of acrylonitrile, said acrylonitrile being copolymerized with other monomers. The result is a membrane which will possess characteristics and performances which are entirely different and apart from those which are possessed by the membranes of the present invention. U.S. Pat. No. 4,220,535 claims a multi-zones hollow fiber permeator which may be obtained from any suitable synthetic or natural material suitable for fluid separation or as supports for materials with solutions of polyamide amines, said admixed solution being cast into membranes. In this patent, the matrix materials such as poly (phenyl ether) are intimately admixed with the polymers, this admixture being unlike and distinct from the membranes of the present invention which are hereinafter set forth in greater detail.

Another U.S. Pat. No. 3,549,569 discloses the use of one-component polyurethane coatings or moisture cured coatings. In this patent, the coatings are based on the use of moisture curing 1-isocyanate-3-isocyanatomethyl-3,5,5-trimethylcyclohexane capped polyether (polyols) having a molecular weight of at least 500. The resulting coatings are flexible, impact resistant and mar resistant.

Another type of semipermeable membrane comprises that prepared from a electrolyte complex. For example, Canadian Patent No. 836,342 describes a membrane prepared from a electrolyte polymer which is cast as a porous film on a support. The resulting membrane comprising the porous electrolyte film on the support is anisotropic in nature. In contrast to the membrane of the present invention, it should be noted that both the rejecting layer and the porous layer of the membrane are comprised of the same material, i.e., the electrolyte polymer. Such membranes, when subjected to high pressures during use, tend to undergo compaction which then results in reduced permeate productivity after a period of time. The compaction of the membrane is due to the collapse of the relatively weak porous structure under pressure. The patent further states that, in general, the concentration of each component of the electrolyte polymer must be at least 0.5% by weight and preferably above 5% by weight of the total solution in order to obtain a satisfactory product. This means then that there must be at least 1% by weight and preferably above 10% by weight of both components of the complex in the solution used to obtain the membrane. Furthermore, the patent also states that the overall thickness or gauge of the membrane varies from 1 to about 20 mils of the membrane and from about 1 to about 10 mils in thickness for the support member of the total product.

As will hereinafter be shown in greater detail it has now been discovered that thin film composite ultrafiltration membranes may be prepared from a polyelectrolyte complex composited on a porous support in which the thin film composite comprises a dense selective relatively thin layer composited on a micro porous sub-layer support. The resulting membrane will be superior to prior art ultrafiltration membranes which are anisotropic in nature due to the fact that the membrane of the present invention will be more resistant to pressure compaction as well as possessing better adhesion between the components and thus will be able to perform the intended use for a longer period of time without the necessity of being replaced.

BRIEF SUMMARY OF THE INVENTION

This invention relates to thin film composite ultrafiltration membranes and to a method for the preparation thereof. These ultrafiltration membranes may be used in the separation of low molecular weight solubles, for example, the separation of glucose from sucrose and higher sugars and the separation of amino acids from oligopeptides and polypeptides. By employing the membranes of the present invention in these processes it is possible to effect the separation process in an efficient manner due to the characteristics of the membrane which include resistance to compaction as well as acceptable flux and separation characteristics.

The advantages of thin film composite membranes which comprise a thin film rejecting layer composited on a dissimilar porous support backing material over an asymmetric membrane in which the rejecting layer and support layer are of the same material are many and varied in character. For example, in the preparation of the membrane of the present invention, it is possible to utilize a wide range or choice of electrolytic polymers as well as supports. This in turn will also allow a wide selection of solvents which are employed to form the casting solution. All of these choices, when combined with the ability to form a relatively thin film of the dense or rejecting layer of the membrane composite as opposed to the relatively thick rejecting layers of an asymmetric membrane, will result in a cost savings for the production of the membrane, thus lowering the overall expense of the entire operation. In addition, the choice of the various elements will also allow the producer of the membrane to control the flux rate and rejection rate of the membranes to tailor said membrane to a specific need. Yet another important difference between the thin film composite membrane of the present invention and the asymmetric membranes of the prior art lies in the improved adhesion of the thin film to the microporous support as compared to the asymmetric polyelectrolyte. As will hereinafter be shown in greater detail the asymmetric membrane does not adhere to the porous support portion of this type of membrane thus leading to membrane delamination during the use of the membrane and hence to a loss of performance. The thin film composite of the present invention adheres in a tenacious manner to the porous support backing material and no delamination occurs. This will permit the membrane of the present invention to be used for a longer period of time in a separation process than is possible when using an asymmetric membrane.

It is therefore an object of this invention to provide thin film composite ultrafiltration membranes which are utilized in a variety of separation processes.

A further object of this invention is found in a process for preparing the aforesaid membrane.

In one aspect an embodiment of this invention resides in a thin film composite membrane prepared by the steps forming a solution composed of a polyelectrolyte complex composed of a polyanion and a polycation, casting said solution on a microporous support, draining excess solution, curing the resultant composite, and recovering said composite.

A further embodiment of this invention is found in a process for the preparation of a thin film composite membrane which comprises dissolving a polyanion and a polycation in an acidic alcoholic solution to form a polyelectrolyte complex, casting said solution on a microporous support, removing excess solution, curing the resultant thin film composite membrane, and recovering said membrane.

A specific embodiment of this invention is found in a thin film composite membrane prepared by the steps of forming a solution of a polyelectrolyte complex composed of the anion of the sodium salt of polystyrene sulfonate and the cation of polyvinyl benzyl trimethylammonium chloride, said complex being present in said solution in an amount in a range from about 0.2% to about 1.0% by weight, casting said solution on a microporous support comprising polysulfone, draining excess solution from said polysulfone support, curing the resultant composite and recovering said composite.

Another specific embodiment of this invention is found in a process for the preparation of a thin film composite membrane which comprises dissolving the sodium salt of polystyrene sulfonate and polyvinyl benzyl trimethylammonium chloride in an acidic alcoholic solution comprising a mixture of a solution of ethanol and hydrochloric acid, said complex being present in said solution in an amount in the range from about 0.2% to about 1.0% by weight, casting said solution on a porous support comprising polysulfone, removing excess solution, curing said composite at a temperature in the range from about 50° to about 100° C. for a period of time in the range from about 5 minutes to about 60 minutes and recovering said membranes.

This invention also contemplates a process for the separation of molecules based upon small differences in size comprising passing a mixture of molecules of varying size across a composite membrane and collecting a permeate and a retentate, said membrane prepared by the steps comprising preparing a solution comprising a polyelectrolyte complex composed of a polyanion and a polycation, casting the solution on a microporous support to form a thin film on the support, draining the excess solution, curing the thin film-coated support, and recovering the resultant composite membrane. This invention also contemplates using this membrane in a process for the separation of amino acids from oligopeptides and polypeptides comprising passing a mixture comprising amino acids, oligopeptides, and polypeptides across a composite membrane and collecting a permeate enriched in the amino acids and a retentate.

Other object embodiments will be found in the following detailed description of the invention.

DETAILED DESCRIPTION OF THE INVENTION

As hereinbefore set forth, the present invention is concerned with thin film composite ultrafiltration membranes, said membranes being used in a wide variety of separation processes. As was previously stated in general, ultrafiltration membranes are cast as an asymmetric membrane comprising a dense selective layer and a porous support sub-layer comprising the same material. Such membranes possess several drawbacks or disadvantages. For example, during the use of these membranes for separating components found in various solutions, the membranes are subjected to relatively high pressures, that is pressures ranging up to about 600 pounds per square inch gauge. The porous layer of the composite is mechanically weak in nature and will undergo compaction during the separation process, thus resulting in reduced permeate productivity of the fluid during the period of time of the separation process. In contra-distinction to this, the present invention is concerned with ultrafiltration membranes which will be free of such a disadvantage concerning compaction of the membranes due to the fact that the membrane comprises a dense layer supported by a microporous backing. This type of membrane configuration does not undergo compaction inasmuch as the backing, such as polysulfone, is pressure resistant in nature. The membrane of the present invention, in hereinafter shown in greater detail will be in demand in the membrane industry for highly selective separation processes which will separate molecules distinguished by small differences in size, as for example, the separation of a monomer from a dimer or polymer of a low molecular weight organic compound, specific examples of this being the separation of sugars or the separation of amino acids from oligopeptides and polypeptides. Examples of amino acids which could be separated from oligopeptides and polypeptides include but not limited to alanine, phenylalanine, glycine, glutamine, aspartic acid, leucine, isoleucine, proline, and tryptophan. These amino acids are also examples of the "monomers" which make up the oligopeptide and polypeptide "polymers."

The thin film composite ultrafiltration membrane of the present invention comprises a polyelectrolyte polymer composited on a microporous support. The polyelectrolyte complex which forms the dense layer of the composite membrane is prepared by dissolving a polyanion and a polycation in an appropriate solvent to form a casting solution. Examples of polyanions which may be utilized as one component of the polyelectrolyte complex will include the alkali metal salts of sulfonates and carboxylates, some specific examples of this being the sodium salt of polyacrylic acid, the potassium salt of polyacrylic acid, the lithium salt of polyacrylic acid, the sodium salt of polymethylacrylic acid, the potassium salt of polymethylacrylic acid, the lithium salt of polymethylacrylic acid, the sodium salt of polyitaconic acid, the potassium salt of polyitaconic acid, the lithium salt of polyitaconic acid, the sodium salt of polyvinysulfonic acid, the potassium salt of polyvinyl sulfonic acid, the sodium salt of polystyrene sulfonic acid, the potassium salt of polystyrene of sulfonic acid, as well as copolymers thereof. Examples of polycations which may be employed as a second component of the polyelectrolyte complex will include polyvinyl benzyl trimethylammonium chloride, polyvinyl benzyl trimethylammonium bromide, polyvinyl benzyl trimethylammonium iodide, polydiallyl dimethylammonium chloride, polydiallyl dimethylammonium bromide, polydiallyl dimethylammonium iodide, etc. It is to be understood that the aforementioned examples of polyanions and polycations are only representative of these compounds which may be employed, and that the present invention is not necessarily limited thereto.

The particular solvent which is employed to dissolve the polyanion and polycation to form the desired casting solution will be determined by the solubility of the polyelectrolyte complex as well as by the compatibility to the particular porous support backing material on which the solution is cast.

The liquid medium in which the complex is dissolved will comprise an alcoholic/acidic solution. The alcoholic portion of the solution will comprise an alcohol containing 1 to about 4 carbon atoms, such as methyl alcohol, ethyl alcohol, propyl alcohol, isopropyl alcohol, butyl alcohol, sec-butyl alcohol, etc. The acidic portion of the solution will comprise acids such as hydrochloric acid, perchloric acid, sulfonic acid, etc. As in the case of the polyanions and polycations it is to be understood that the list of alcohols and acids which are employed are only representative compounds and the present invention is not necessarily limited thereto. The ratio of alcohol to acid in the solution may vary over a relatively wide range, as for example, the alcohol may be present in the solution in a range of from about 10% to about 90% while the acid conversely may be present in an amount in the range of from about 90% to about 10%. The amount of polycations and polyanions which is present in the solution is that which is sufficient to form a solution in which the strength of the polyelectrolyte complex formed from the polyanion and polycation will be from about 0.2 to about 1.0% by weight.

The polyelectrolyte complex and the casting solutions can be prepared by several different methods. For example, in one method a weighed quantity of the polyanion as exemplified above is added to a solvent of the type hereinbefore set forth and stirred until a major portion thereof is dissolved. Following this a desired quantity of the polycation is added and the stirring is continued. As stirring and the resultant dissolution of the components progress, the solution becomes viscous in nature due to the formation of the polyelectrolyte complex. At the same time the salt, which is the by-product of the reaction, precipitates out of the solution. In one embodiment, if so desired, in order to prepare the polyelectrolyte complex in large quantities the amount of polyanion and polycation may be chosen so as to yield a solution containing a solids content as high as 20%. Thereafter the mixture of polyelectrolyte complex and salt is centrifuged to separate and remove the salt, thus obtaining a clean solution which may serve as a stock solution.

The desired casting solution which is used to cast the thin film composite membrane of the present invention is prepared by diluting a desired quantity of the stock solution with the solvent so as to provide a finished solution containing from about 0.2% to about 1.0% solids content.

A second method of preparing the desired casting solution is to pour the stock solution into a large quantity of water accompanied by constant stirring. The polyelectrolyte will precipitate out and can be recovered by filtration, dried by conventional means to remove the water and thereafter utilized to prepare a casting solution by dissolving a desired amount in an appropriate solvent to provide a solution containing from about 0.2% to about 1.0% by weight of the polyelectrolyte complex.

Alternatively, if so desired, the casting solution may be directly prepared by dissolving desired quantities of the polyanion and polycation directly into an appropriate solvent to form a polyelectrolyte complex solution containing from about 0.2% to about 1.0% of the complex with a simultaneous precipitation of the salt which is removed by filtration, the clean solution then being employed to prepare the desired membrane.

In one embodiment the semi-permeable ultrafiltration membrane of the present invention may be prepared by coating a porous support backing material with a solution of the polyelectrolyte complex. The microporous support backing material comprises a polymeric material containing pore sizes which are sufficient to permit the passage of the permeate thereto but not large enough so as to interfere with the bridging over of the ultrathin membrane. In the preferred embodiment of the invention, the pore sizes of the microporous support backing material will range from about 50 to about 1000 Å inasmuch as pores which are larger than 1000 Å will permit the ultra thin membrane to sag into the pores, thus disrupting the continuity of the ultrathin film which is a desirable characteristic of the membrane. Examples of microporous support backing material which may be used to prepare the desired membrane composite will include polymers, such as polysulfone, polycarbonate, microporous polypropylene, the various polyamides, e.g., nylon, polyphenol ether, polyvinyl chloride, polyvinylidene fluoride, etc.

The thin film composite ultrafiltration membrane of the present invention may be prepared either by continuously casting the thin film on the microporous support or by hand casting said composite on the support. When utilizing a hand casting operation, the microporous support may be taped on an additional support member such as a glass plate and dipped into the polyelectrolyte complex solution which is contained in a vertical tank. After immersion of the support in the solution for a predetermined period of time which may range from about 1 to about 15 seconds in duration, the support is drained in a vertical position until all excess solution is removed. The pores of the thin film composite will range from about 5 to about 20 Angstroms in diameter and by utilizing a solution which contains only from about 0.2% to about 0.5% by weight of the polyelectrolyte complex it is possible to obtain a thin film of the membrane on the porous support which possesses a thickness in the finished product ranging from about 600 to about 3000 angstroms. Following removal of all excess solution, the thin film composite ultrafiltration membrane is then cured for a predetermined period of time at a predetermined temperature. The time and temperature parameters may range from about 5 to about 60 minutes, preferably about 5 minutes to about 30 minutes at a temperature ranging from about 40° to about 100° C., preferably about 40° to about 75° C. The operating parameters of time and temperature will be interdependent, the primary criteria for the curing of the membrane being that said curing time is sufficient to provide the desired membrane but being insufficient to affect the desired characteristics of the thin film membrane and the microporous support material. For example, excessive heat or curing time may affect the pore size of the backing support material, thus resulting in a decrease of the desired flux rate of the membrane.

It is also contemplated within the scope of this invention that the thin film composite ultrafiltration membrane may be prepared in a continuous manner of operation. When this type of operation is employed, a microporous support backing material of the type hereinbefore set forth in greater detail is continuously unwound from a feed roller and passed through a trough or bath containing the solution of the polyelectrolyte complex dissolved in the solvent. After a residence time in the casting solution which may range from about 10 to about 20 seconds, the coated backing material is continuously withdrawn, and if so desired, passed between rollers in order to remove any excess solution which may still be present. The membrane is then dried in an oven to remove any solvent vapors. Any residual solvent on the membrane is then removed by washing with water. The curing time in the oven may range from about five to about 60 minutes, preferably about five minutes to about 30 minutes in duration, usually at a temperature ranging from about 40° to about 100° C., preferably about 40° C. to about 70° C. It has now been found that by a careful control of the drying step it is possible to obtain a membrane which possesses desirable properties. For example, by controlling the evaporation or curing rate of the membrane over a predetermined period of time and relatively mild temperature conditions, the resulting membrane will possess good rejection and flux rates as opposed to membranes which cured under more severe conditions of temperature such as those found when using a forced air circulating oven.

The resultant thin film composite ultrafiltration membrane may then be employed in the separation processes hereinbefore set forth. Inasmuch as the membranes are in the form of flat sheets, said membrane is applicable for use in modules in either single sheet or multiple sheet units whereby the sheet or sheets are wound in a spiral-type configuration.

The following examples are given for purposes of illustrating the thin film composite ultrafiltration membranes of the present invention and to their use thereof as separation agents. However, it is to be understood that these examples are provided merely for purposes of illustration, and that the present invention is not necessarily limited thereto.

EXAMPLE I

A thin film composite ultrafiltration membrane was prepared by dissolving a sufficient amount of the sodium salt of polystyrene sulfonate and polyvinyl benzyl trimethylammonium chloride in a solution consisting of equal amounts of ethyl alcohol and concentrated hydrochloric acid to provide a stock solution containing about 20% by weight of the solid polyelectrolyte complex. Following this, a sufficient quantity of the stock solution was diluted with an additional amount of the same solvent to produce a casting solution which contained 0.2% by weight of the polyelectrolyte complex. To form the desired membrane a microporous polysulfone support measuring 7 inches by 5 inches was taped to one side of a glass plate and immersed in a solution of the polyelectrolyte complex in a vertical tank for a period of ten seconds. The glass plate containing the coated polysulfone was removed and drained in a vertical position until all of the liquid was completely drained therefrom. Following this, the membrane was then cured for a period of ten minutes in an oven at a temperature of 60° C. This membrane was designated as A.

EXAMPLE II

In this Example a second sheet of membrane was prepared in a manner similar to that set forth in Example I above. However, the membrane was only dried in ambient air and was not cured in an oven as was membrane A. This membrane was designated as B.

EXAMPLE III

A third sheet of membrane was produced in a manner also similar to that set forth in Example I above, by immersing a microporous polysulfone support in a vertical tank containing a polyelectrolyte complex solution containing 0.2% by weight of the polyelectrolyte complex. After immersion for a period of 10 seconds, the glass plate was drained and thereafter the membrane was cured in an oven for a period of 10 minutes at a temperature of 80° C. This membrane was designated as C.

EXAMPLE IV

A fourth sheet of membrane was prepared by immersing a microporous polysulfone support taped to a glass plate in a vertical tank which contained a polyelectrolyte complex solution similar to that set forth in Example I above, the difference being that the complex formed from the sodium salt of polystyrene sulfonate and polyvinylbenzyl trimethylammonium chloride was present in an amount of 1% by weight. The immersion of the support in the tank was for a period of 1 minute. Following this the coated support was removed from the tank, drained in a vertical position until all the liquid was removed and thereafter cured in an oven for a period of 12 minutes at a temperature of 65° C. This membrane was designated as D.

Another membrane similar in nature to that described in the above paragraph was prepared in a similar manner, the only difference being that the coated support was cured in an oven at a temperature of 80° C. for a period of 12 minutes. This membrane was designated as E.

EXAMPLE V

Samples of membranes prepared according to the above examples were utilized in a sugar separation experiment. In the experiment, two pieces each of membranes A, B and C and one piece of membranes D and E were tested by placing the sheet measuring 1 inch by three inch-in size in a membrane cell. A sugar feed which contained 29.5% by weight of a mixture of glucose, sucrose, trimer and tetramer of glucose in water was passed over the membranes at a pressure of 150 pounds per square inch gauge while maintaining the temperature of the feed at 60° C. The permeate and the retentate were returned to the feed tank. Permeate samples were obtained at the end of a 1.5 hour test period for sugar analysis. The results of this test are set forth in Table I below:

TABLE I

| MEMBRANE | FLUX (GFD) | % PERMEATE SOLIDS |
|---|---|---|
| A | 16.94 | 23.7 |
| A | 9.16 | 22.3 |
| B | 29.30 | 25.1 |
| B | 25.10 | 26.0 |
| C | 14.19 | 24.3 |
| C | 13.73 | 24.0 |

TABLE I-continued

| MEMBRANE | FLUX (GFD) | % PERMEATE SOLIDS |
|---|---|---|
| D | 2.66 | 15.6 |
| E | 2.50 | 11.7 |

Since these membranes preferentially reject higher sugars, it may be inferred from the above table that the permeates containing lower solids content than the feed will also contain a higher percentage of glucose ($DP_1$) than the feed stock. More detailed analysis is set forth later. The results set forth in Table I indicate that membranes which were produced from a 0.2% solution was more effective in separating glucose from other components of the feed than was found in a membrane which was prepared from a polyelectrolyte solution containing 1% of the polyelectrolyte complex. This is evident from the higher permeate flux for membrane A than the membrane E. Also, membrane E allowed only 11.7% solids in the permeate. This suggests that the membrane stops not only the higher sugar but also a significant quantity of glucose.

EXAMPLE VI

In this example a series of membranes were prepared from a continuously cast operation. Casting solutions were prepared by dissolving sufficient amounts of the polyelectrolyte complex in a solvent comprising 50/50 by volume mixture of ethyl alcohol and concentrated hydrochloric acid to provide a concentration of 0.27% and 0.32% of the polyelectrolyte complex. The desired thin film composite ultrafiltration membrane was prepared by continuously unwinding a polysulfone support from a feed roller and passing said polysulfone through a trough containing the casting solution. The membrane was then dried in an oven to remove the solvent vapors and to set the membrane structure. It was found that the drying step of the preparation should be relatively gentle in nature in order to insure that the membrane characteristics or properties are desirable rather than undesirable. The membranes which were prepared from a casting solution containing 0.27% by weight of the polyelectrolyte complex were cured in a convection oven at a temperature of 45° C. for a period of 10 minutes and labelled F. Likewise, the membranes prepared from a casting solution containing 0.32% by weight of polyelectrolyte complex were also cured in a convection oven at similar conditions. A second set of membranes containing 0.32% by weight of the polyelectrolyte complex were cured in a machine oven at a temperature of 45° C. for a period of 10 minutes with the circulating fan in the oven off. The former 0.32% membrane were labelled G while the latter membranes which were cured in the machine oven were labelled H.

EXAMPLE VII

Samples of the membranes prepared according to the above example were also tested for sugar separation in a circular cell under conditions similar to those utilized in the sugar separation process set forth in Example V. Percent rejections of glucose, sucrose and higher sugars were obtained by liquid chromatography on the permeate and feed samples. The results of these tests are set forth in Table II below:

TABLE II

| MEMBRANE | DP$_2$ REJECTION % 3 Hrs. | DP$_2$ REJECTION % 6 Hrs. | FLUX (GFD) 3 Hrs. | FLUX (GFD) 6 Hrs. |
|---|---|---|---|---|
| F | 50.7 | 48.1 | 4.4 | 4.5 |
| F | 53.2 | 47.0 | 5.2 | 5.0 |
| F | 53.7 | 21.4 | 4.7 | 4.9 |
| G | 73.6 | 75.6 | 3.9 | 4.0 |
| G | 74.0 | 75.6 | 3.9 | 4.0 |
| G | 71.5 | 78.3 | 3.9 | 3.7 |
| H | 67.8 | 71.8 | 4.3 | 4.3 |
| H | 70.5 | 73.8 | 4.6 | 4.6 |

Membranes possessing DP$_2$ (sucrose) rejection of 70% or greater are considered especially commercially attractive. They will help produce high-purity glucose.

EXAMPLE VIII

To illustrate the proposition that the thin film composite membranes of the present invention possess superior characteristics or properties compared to the anisotropic membrane due to the fact that they are more resistant to pressure compaction, another experiment was performed. A sheet of membrane measuring 3 inches by 10 inches which was prepared by dip coating a dilute solution containing 0.32% polyelectrolyte complex, in a solvent comprising a 50/50 percent by volume mixture of ethyl alcohol and hydrochloric acid on a microporous polysulfone support. The membrane was placed in a cell and exposed to a feed comprising purified water at a temperature of 60° C. and a pressure of 150 lbs. per square inch gauge. The membrane was exposed to the hot water feed for a period of approximately 180 hours. In order to measure the compaction factor the flux and time were plotted as a log-log plot. Over the period of the test the slope of the compaction line was minus 0.01 which indicated a very low compaction factor. In contrast to this asymmetric membranes have a compaction factor of about minus 0.1.

EXAMPLE IX

To further illustrate the difference between asymmetric membranes and the thin film composite membranes of the present invention contrasting membranes were prepared. Asymmetric membranes were cast to a thickness of about 150 microns while the film composite membrane was cast to a thickness of about 0.15 microns. Spiral elements were constructed from the flat sheet membrane both asymmetric and thin film composite. The spiral element each contained one sheet of the membrane. The spiral elements were both tested under similar conditions, flux rates and rejection rates being measured at various operating pressures starting at a pressure of 150 psig and increasing progressively to 450 psig. The feedstock comprised a commercial feedstream resulting from the hydrolysis of corn starch and contained a mixture of sugars. The results of these tests are set forth in Table III below:

TABLE III

| HOURS | FLUX (GFD) Asymmetric Membrane | FLUX (GFD) Thin Film Membrane | % DP$_2$ REJECTION Asymmetric Membrane | % DP$_2$ REJECTION Thin Film Membrane |
|---|---|---|---|---|
| 350 | 17 | 11 | | |
| 375 | 12.7 | 8.5 | 0.66 | 0.82 |
| 400 | 11 | 7.7 | 0.68 | 0.83 |
| 425 | 11 | 7.7 | 0.69 | 0.84 |
| 450 | 10 | 7.8 | 0.70 | 0.85 |
| 475 | 12 | 7.2 | 0.68 | 0.85 |
| 500 | 9.3 | 7.2 | 0.70 | 0.86 |
| 525 | 9.2 | 7.0 | 0.69 | 0.87 |
| 550 | 7.3 | 6.8 | 0.71 | 0.87 |
| 575 | 9.0 | 6.2 | 0.70 | 0.87 |
| 600 | 9.0 | 6.5 | 0.72 | 0.88 |
| 625 | 8.8 | 6.2 | 0.72 | 0.87 |
| 650 | 8.2 | 5.8 | 0.73 | 0.87 |
| 675 | 8.0 | 5.9 | 0.82 | 0.92 |
| 700 | 7.7 | 5.8 | 0.70 | 0.87 |
| 725 | 7.1 | 5.0 | 0.72 | 0.87 |
| 750 | 7.5 | 5.5 | 0.70 | 0.86 |
| 775 | 7.4 | 5.5 | 0.70 | 0.86 |
| 800 | 7.3 | 5.7 | 0.69 | 0.87 |
| 825 | 7.0 | 5.4 | 0.70 | 0.87 |
| 850 | 7.2 | 5.5 | 0.70 | 0.85 |

It is to be noted from the above table that although the asymmetric membrane spiral started with a higher flux rate, the flux rate continuously dropped during the period of testing. This is in contrast to the flux rate of the thin film membrane which maintained a relatively constant flux rate. In addition, it is to be also noted that the rejection rate of the DP$_2$ sugars was higher than that of the asymmetric spiral membrane.

EXAMPLE X

As was previously indicated a major problem associated with utilizing asymmetric membranes in a separation process is the delamination or separation of the membrane from the backing material. When the asymmetric membrane is cast on a support material such as polyethylene, the adhesion between the two layers is poor. Therefore, the backing material must be pretreated to improve or increase the adhesion. Some types of pretreatment which may be cited by way of example would include corona treatment, plasma treatment, etching with corrosive chemicals such as chromic acid or sodium hypochlorite to name a few.

However, even with this pretreatment the resulting adhesion is still not satisfactory. When the membrane is used in a spiral configuration module the feed is pumped at high velocities against the membrane. At the inlet end of the spiral, the feed encounters the cross-section of the backing material, the membrane, and the feed spacer. If the adhesion between the backing material and the membrane is not good, the feed stream can separate the two layers and work its way into the permeate, thereby limiting the useful life of the spiral as well as diminishing the effective rate of the separation.

To illustrate the effectiveness of the membrane of the present invention, a series of asymmetric membranes were prepared by casting a solution containing 19% by weight of the polyelectrolyte complex on a polyethylene backing material which had been pretreated by various methods. Due to the relatively high amount of complex in the solution, the membrane cast on the backing possessed thickness of 150 microns. The asymmetric membrane was formed by quenching the premembrane in a water bath followed by annealing at a temperature of 85° C.

The membranes were then placed as sheets in a spiral module and the extent of adhesion was measured. The retentate outlet of the module was closed and deionized water was pumped into the feed inlet. The pressure of the feed at the inlet was increased until the fluid found its way into the permeate. In the following tests a pressure drop in excess of 20 pounds per square inch gauge indicates that there is sufficient adhesion between the membrane and backing material to constitute an acceptable membrane which is capable of operating over a considerable extent of time in a separation process. The results of these tests on the asymmetric membrane are set forth in Table IV below:

TABLE IV

| Membrane | Backing Treatment | Pressure Drop Failure (psig) |
|---|---|---|
| 1 | Plasma | 14[a] |
| 2 | Plasma | 15[a] |
| 3 | Plasma | 14[a] |
| 4 | Plasma | 9[a] |
| 5 | NaOCl | 7 |
| 6 | NaOCl | 19 |
| 7 | NaOCl | 11 |
| 8 | Norchromix[b]/H$_2$SO$_4$ | 11 |
| 9 | Nochromix[b]/H$_2$SO$_4$ | 13[a] |
| 10 | Nochromix[b]/H$_2$SO$_4$ | 9[a] |

[a]Indicates backing separation
[b]An oxidizing agent supplied by Godax Laboratories In contradistinction to this a membrane of the present invention comprising a thin film of polyelectrolyte complex having a thickness of 0.15 micron composited on a polysulfone porous backing material which was not pretreated, said membrane having been prepared according to the process described in the specification, withstood a pressure drop of 40 psig. This confirms the ruggedness and tenacious adherence of the thin film to the porous backing material and its ability to be utilized as a separation membrane over a relatively long period of time.

EXAMPLE XI

The membrane of Example I may be used to separate amino acids from oligopeptides and polypeptides. A solution containing phenylalanine, and the di-, tri-, and higher polypeptides of phenylalanine is passed over the membrane under pressure (about 20 psig to about 200 psig) under ambient to elevated temperatures (20° to 60° C.). The amino acid phenylalanine is recovered in the permeate.

I claims as my invention:

1. A process for the separation of molecules based upon small differences in size comprising passing a mixture of molecules of varying size across a composite membrane and collecting a permeate and a retentate, said membrane prepared by the steps comprising:
   (a) preparing a solution comprising a polyelectrolyte complex composed of a polyanion and a polycation;
   (b) casting the solution on a microporous support to form a thin film on the support;
   (c) draining the excess solution;
   (d) curing the thin film-coated support; and,
   (e) recovering the resultant composite membrane.

2. The process of claim 1 in which the mixture comprises monomers, dimers, and polymers of a low molecular weight organic compound and in which the organic compounds present in the permeate consist substantially of said monomers.

3. The process of claim 2 in which the mixture comprises glucose and sucrose and in which the organic compounds present in the permeate consist substantially of glucose.

4. The process of claim 1 in which the mixture comprises a feed resulting from the hydrolysis of cornstarch and in which the organic compounds present in the permeate consist substantially of glucose.

5. The process of claim 1 in which the polyelectrolyte complex is present in the solution in an amount in the range of from about 0.2% to about 1.0% by weight.

6. The process of claim 1 in which the solution also comprises an alcohol containing from 1 to about 4 carbon atoms and an acid.

7. The process of claim 6 in which the alcohol comprises ethanol and the acid comprises hydrochloric acid.

8. The process of claim 1 in which the polyanion comprises an alkali metal salt of a polymer selected from the group consisting of polystyrene sulfonic acid, polyacrylic acid, polymethylacrylic acid, polyitaconic acid, polyvinyl sulfonic acid and copolymers thereof.

9. The process of claim 8 in which the polyanion is the sodium salt of polystyrene sulfonic acid.

10. The process of claim 8 in which the polyanion is the sodium salt of polyacrylic acid.

11. The process of claim 8 in which the polyanion is the potassium salt of polyitaconic acid.

12. The process of claim 1 in which the polycation is selected from the group consisting of polyvinyl benzyl trimethylammonium chloride, polyvinyl benzyl trimethylammonium bromide, polyvinyl benzyl trimethylammonium iodide, polydiallyl dimethylammonium chloride, polydiallyl dimethylammonium bromide and polydiallyl dimethylammonium iodide.

13. The process of claim 12 in which the polycation is polyvinyl benzyl trimethylammonium chloride.

14. The process of claim 12 in which said polycation is polydiallyl dimethyl ammonium chloride.

15. The process of claim 12 in which said polycation is polyvinyl benzyl trimethylammonium bromide.

16. The process of claim 1 in which the microporous support is selected from the group consisting of polysulfone, nylon, polyvinyl chloride, polypropylene, and polyvinylidene fluoride.

17. The process of claim 1 in which the thin film on the composite membrane possesses a thickness in the range of from about 600 to about 3000 Angstroms.

18. The process of claim 1 in which the pores of the thin film on the composite membrane are from about 5 to about 20 Angstroms in diameter.

19. The process of claim 1 in which the microporous support comprises polysulfone.

20. The process of claim 1 in which the curing of the membrane is effected at a temperature of from about 40° to about 100° C. for a period of time in the range of from about 5 minutes to about 60 minutes.

21. A process for the separation of amino acids from oligopeptides and polypeptides comprising passing a mixture comprising amino acids, oligopeptides, and polypeptides across a composite membrane and collecting a permeate enriched in the amino acids and a retentate, said membrane prepared by the steps comprising:
   (a) preparing a solution comprising a polyelectrolyte complex composed of a polyanion and a polycation;
   (b) casting the solution on a microporous support to form a thin film on the support;
   (c) draining the excess solution;
   (d) curing the thin film-coated support; and,
   (e) recovering the resultant composite membrane.

* * * * *